US007756834B2

(12) United States Patent
Masters et al.

(10) Patent No.: US 7,756,834 B2
(45) Date of Patent: Jul. 13, 2010

(54) MALWARE AND SPYWARE ATTACK RECOVERY SYSTEM AND METHOD

(75) Inventors: Daniel Masters, Oceanside, CA (US); Chris Neill, San Diego, CA (US)

(73) Assignee: I365 Inc., Santa Clara, CA (US)

( * ) Notice: Subject to any disclaimer, the term of this patent is extended or adjusted under 35 U.S.C. 154(b) by 419 days.

(21) Appl. No.: 11/266,528

(22) Filed: Nov. 3, 2005

(65) Prior Publication Data

US 2007/0100905 A1    May 3, 2007

(51) Int. Cl.
G06F 12/00 (2006.01)
G06F 17/30 (2006.01)
G06F 12/14 (2006.01)
G06F 12/16 (2006.01)

(52) U.S. Cl. .................. 707/640; 707/674; 726/22; 726/23; 726/24; 714/2; 714/15

(58) Field of Classification Search ................ 707/201, 707/202, 999.201, 999.202; 726/22–24; 714/2, 15
See application file for complete search history.

(56) References Cited

U.S. PATENT DOCUMENTS

| 5,649,196 | A | 7/1997 | Woodhill et al. |
| 6,240,527 | B1 | 5/2001 | Schneider et al. |
| 6,701,456 | B1 | 3/2004 | Biessener |
| 6,732,125 | B1 | 5/2004 | Autrey et al. |
| 6,871,271 | B2 | 3/2005 | Ohran et al. |
| 6,898,688 | B2 | 5/2005 | Martin et al. |
| 7,406,488 | B2 * | 7/2008 | Stager et al. ................ 707/204 |
| 2002/0049883 | A1 | 4/2002 | Schneider et al. |
| 2005/0015416 | A1 * | 1/2005 | Yamagami .................. 707/204 |
| 2005/0055559 | A1 * | 3/2005 | Bucher ....................... 713/188 |
| 2005/0063374 | A1 | 3/2005 | Rowan et al. |
| 2005/0066118 | A1 | 3/2005 | Perry et al. |

* cited by examiner

Primary Examiner—James Trujillo
Assistant Examiner—Bruce M Moser
(74) Attorney, Agent, or Firm—Weaver Austin Villeneuve & Sampson LLP

(57) ABSTRACT

A method and computer program product with encoded instructions provides for repeatedly making data backups for files by making a series of snapshots of file storage volumes containing the files. The method and computer product further provide for determining that a malware attack has occurred, identifying corrupted files and, for each corrupted file, scanning the series of snapshots to identify an uncorrupted version of the file. Each corrupted file is restored to an uncorrupted version thereof. An event log contains write events and snapshot creation events corresponding to creation of each of the snapshots. A forensic scan scans the event log to determine modifying writes made by the corrupted files and which modified further files. The further files are restored to unmodified versions thereof. A list of at-risk files includes the corrupted files and the further files and the forensic scan is repeated on the at-risk files.

42 Claims, 4 Drawing Sheets

MALWARE AND SPYWARE ATTACK RECOVERY SYSTEM AND METHOD

FIELD OF THE INVENTION

The present invention relates, most generally, to computer systems and software used in computer systems. More particularly, the present invention relates to a malware recovery system that reduces the financial impact of malware attack by minimizing data losses associated with attack recovery.

BACKGROUND

Attacks by malicious software, or malware in computer systems cost the global business community more than 11 billion dollars annually despite ongoing efforts in anti-malware technology. Malware includes computer viruses, worms, Trojan horses and also spyware, programming that gathers information about a computer without user permission. A large percentage of these losses is attributable to lost data. Once a malware outbreak corrupts a system, entire volumes of data must be rolled back to a point in time prior to the original malware outbreak. The more time that passes before a malware attack is detected, the greater the loss of data and the greater the costs associated with restoring the data. Typically, entire volumes of data must be restored from backups that were created days or weeks earlier. The retrieval and restoration of volumes of data may be due to delays in detecting the malware, the type of malware attack or the infrequency in making data backups. When malware instances penetrate an organization's defenses, the attacks may be gradual, progressive and sustained, and therefore difficult to detect. Malware often corrupts files in ways that can elude malware scanners, such as modifying them without inserting a copy of themselves or inserting morphed instances of themselves. Forensic analysis is complicated by the fact that programs infected by the original malware might corrupt new files before the attack is detected.

Even if frequent backups are made, only those backups made before the original attack are typically considered safe for recovery purposes. Such backups of entire volumes of files and data that precede the original attack, could be weeks old. The time and costs associated with restoring entire volumes using backups created days or weeks earlier, could be staggering.

It would therefore be desirable to quickly identify a malware attack, locate every file that was damaged in the attack and restore the corrupted file to an uncorrupted version by providing frequent data backups that are quickly recoverable as soon a malware attack is detected.

SUMMARY OF THE INVENTION

To address these and other needs and in view of its purposes, one aspect of the present invention provides a method for malware recovery in a computer system comprising repeatedly making associated data backups for each of a plurality of files by making a series of snapshots of file storage volumes containing the plurality of files, each of the data backups comprising versions of the associated file including uncorrupted versions of the associated file; determining that an attack by a malicious program has occurred; identifying corrupted files of the plurality of files that were corrupted by the malicious program; for each corrupted file, scanning the series of snapshots to identify at least one uncorrupted version of the uncorrupted versions of the file; and for each corrupted file, restoring the file to one of the uncorrupted versions thereof.

According to another aspect, the invention provides a computer program product with encoded instructions for performing operations. A computer-readable storage medium stores program code for causing a computer to carry out operations including: a) repeatedly making associated data backups for each of a plurality of files by making a series of snapshots of file storage volumes containing the plurality of files, each of the data backups comprising versions of the associated file, including uncorrupted versions of the associated file; b) determining that an attack by a malicious program has occurred; c) identifying corrupted files of the plurality of files that were corrupted by the malicious program; d) for each corrupted file, scanning the series of snapshots to identify an uncorrupted version of the uncorrupted versions of the file; and e) for each corrupted file, restoring the file to one of the uncorrupted versions.

A further aspect of the method and computer program product of the invention provides for creating and maintaining an event log that contains write events corresponding to writes performed by the plurality of files, and snapshot creation events corresponding to the creation of each of the snapshots. A forensic scan scans the event log to determine which of the writes were modifying writes that were made by the corrupted files and which modified further files of the plurality of files. The method and computer program product of the invention further provide defining a first list of at-risk files comprising the corrupted files and the further files; performing a forensic scan that scans the event log to determine modifying writes that were made by the at-risk files and which modified additional files of the plurality of files, and adding the additional files to the first list and repeating the forensic scan.

BRIEF DESCRIPTION OF THE DRAWING

The present invention is best understood from the following detailed description when read in conjunction with the accompanying drawing. According to common practice, the various features of the drawing are not necessarily to scale. Like numerals denote like features throughout the specification and drawing.

DETAILED DESCRIPTION

Figure 1:
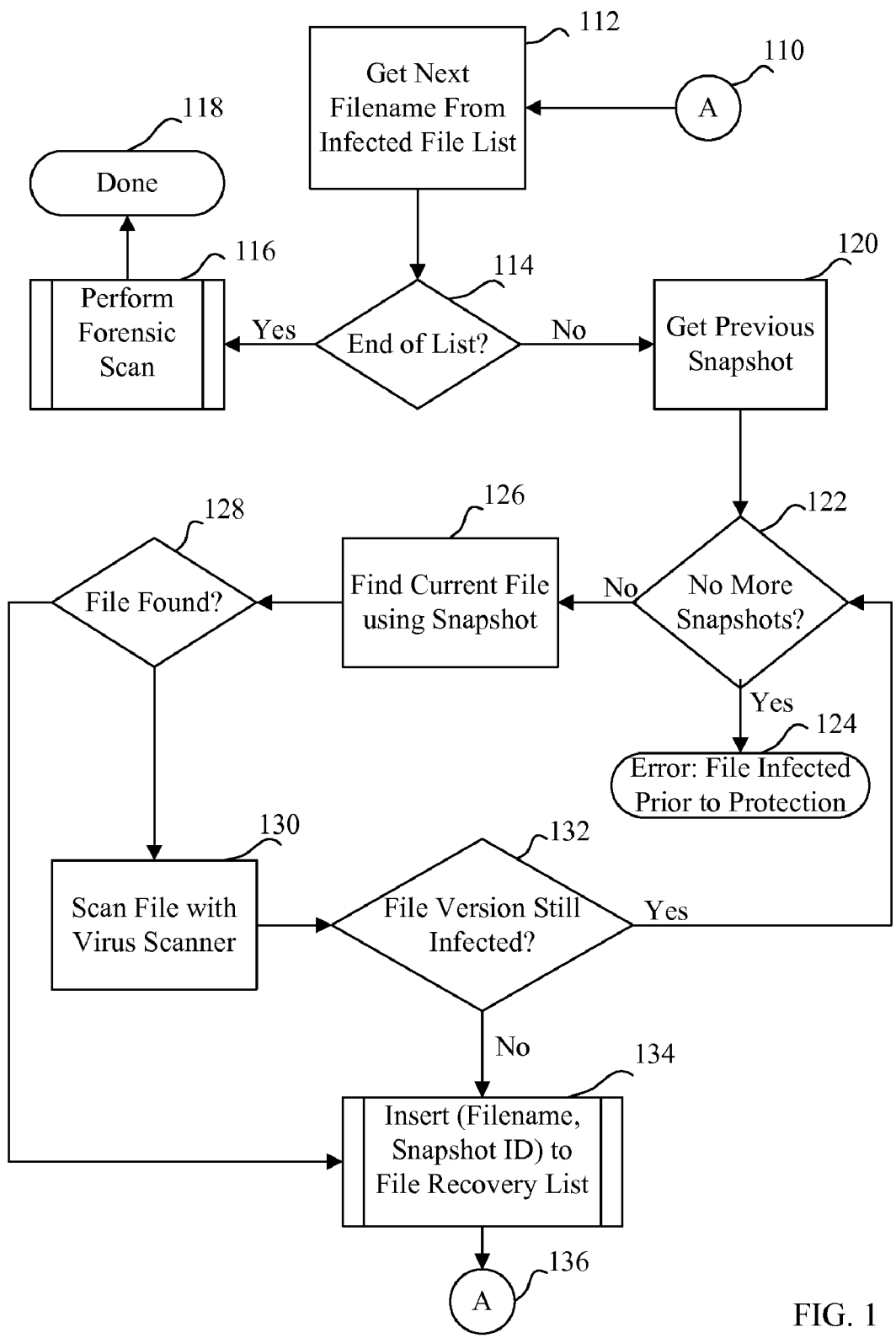
FIG. 1 is a flow chart showing the recovery process for finding the most recent non-infected versions of infected files by scanning files in previous snapshots.

The present invention is directed to a method for malware detection and recovery in a computer system. The invention is also directed to a computer-readable storage medium that stores program code for causing a computer to recover from a virus or other malware that has attacked the computer. The malware may be malicious software including but not limited to a process, program, script, macro, cookie, configuration file, and the like. Malware includes computer viruses, worms, Trojan horses and also spyware—programming that gathers information about a computer without user permission. A computer program product with encoded instructions for performing operations provides for repeatedly making data backups for each of a plurality of files by making a series of snapshots of file storage volumes containing the plurality of files. The data backups may be repeatedly made at frequencies ranging from very slow to essentially instantaneous, as quickly as allowed within the limitation of the technology. Each of the data backups includes versions of the associated file including uncorrupted versions of the file, and, in particular, the most recent uncorrupted version of the file. A conventional anti-malware scan such as but not limited to an AV (anti-virus) scan is performed on the files to determine if they are infected with a malware or other malicious program. There are a variety of well-known commercial applications that perform such an AV scan to identify infected, i.e. corrupted files. The terms infected and corrupted may be used interchangeably, hereinafter. Files are considered to be corrupted only if identified as such by a malware scanner. The term scan should not be interpreted to limit the scope of the invention. Rather, the term scan covers any process, appliance, program, hardware, software, etc. that is capable of identifying malicious software and from which a list of such identified software can be derived.

For each corrupted file, the series of snapshots in the data backups is scanned to identify a snapshot of an uncorrupted version of the file. In this manner, the most recent uncorrupted version of each corrupted file is identified. The file is then restored to an uncorrupted version of the file, and in one embodiment, the file may be restored to the most recent uncorrupted version of the file. Methods used to restore the file are described below.

Files that were modified or affected by the corrupted files, are then identified as at-risk files. The at-risk file is then restored to an unmodified version thereof. In one embodiment, the at-risk files are identified by creating and maintaining an event log that contains write events corresponding to writes performed by the plurality of files in the storage volumes, and snapshot creation events corresponding to the creation of each of the snapshots. The event log may advantageously include the write events and snapshot creation events being ordered chronologically. The event log may be formatted to include a plurality of write groups, each write group representing all the write events that occur between successive snapshot creation events.

A forensic scan is first performed to scan the writes and snapshot creation events of the event log. The forensic scan determines which of the writes were modifying writes that were made by corrupted files and which modified further files thus identified as at-risk files, i.e., at risk of being corrupted but not confirmed as such by a malware scanner. The time of the modifying write event is also determined. The scan of the event log also identifies the snapshot creation event and associated snapshot of a most recent unmodified version of the modified or at-risk file. The scan may also identify write groups that include the least recent modifying writes. Each at-risk file is then restored to an unmodified version thereof.

The recursive nature of this invention provides for continuing this forensic scan on a list of files including the at-risk files and the known corrupted files. The event log is scanned to determine which of the writes in the event log made by the files in the list were modifying writes that modified still further files. These newly identified modified files are restored to unmodified versions thereof and added to the list of at-risk and corrupted files and the process is repeated continuously until all files have been processed. The repetitive nature of the forensic scan and the addition of files to the at-risk and corrupted list may take place in an iterative or recursive manner.

In this manner, files are continuously identified as being corrupted or at risk (having been modified by a corrupted or at-risk file), restored to unmodified versions thereof and added to the list of files upon which a forensic scan is performed. The files identified as having been modified or affected by files in the list, are restored to unmodified versions thereof and in one embodiment they may be restored to the most recent unmodified version thereof. To restore each file to an unmodified version thereof, the modified file may be replaced by the unmodified version thereof that exists in the snapshot corresponding to the most recent one of the snapshot creation events that took place prior to modification or corruption, i.e. the one that precedes the initial write by which the file was first modified by an at-risk file, i.e., a corrupted or modified (at-risk) file.

Stated alternatively, the invention provides for performing a forensic scan on each file in a first list of files. The forensic scan scans the event log to identify files affected by files in the first list. The first list of files may be defined as containing a set of at-risk files defined as corrupted files and files affected by corrupted files, so initially, the first list of files contains only corrupted files identified by an AV scan. Files affected by corrupted files include any file identified during the forensic scan. Each time a forensic scan is performed and further files affected by at-risk files are identified, these files are added to the first list and the forensic scan is repeated on files of the updated first list. This process is repeated continuously, either iteratively or recursively.

Another aspect of the invention is the performance of "backward" scans. According to this aspect, an event log as described above is created and maintained. The forensic scan is then performed on the event log to identify modifier files that modified the corrupted files, but which may not have yet been identified as corrupted. The modifier files may be treated as if corrupted and further action may be taken on these files. For example, they may be added to the first list identified above. The backward scan thus provides additional security. The modifier files are identified by determining modifying writes made by the modifier files and which modified the corrupted files. By scanning the associated snapshot, a version of the modifier file that existed prior to the write event is determined and the modifier file is restored to the prior version thereof. This optional backwards scan can also be repeated iteratively or recursively.

The present invention provides a technology for tracking down every file that may have sustained damage during a malware attack and the point in time that the file became corrupted. The technology further tracks down every file that was modified by a corrupted file and the point in time that the modified file became modified.

In one embodiment, the technology may be considered to consist of five subsystems:

Malware Scanning Subsystem;
Forensic Analysis Subsystem;
Data Snapshot Subsystem;
File System Activity Tracking Subsystem;
File Recovery Subsystem.

The Malware Scanning Subsystem scans files to determine if they are infected or corrupted with malware. There are a variety of well-known commercial applications embodying a variety of technologies that can perform this task. The Forensic Analysis Subsystem uses snapshot data and file system activity data to deduce which files are at risk of corruption and which snapshot contains the most recently uncontaminated version of that file as previously defined. It includes the creation and maintenance of the event log that contains write events and snapshot creation events and performs the scan that scans the event log to determine which of the writes were made by corrupted files or at-risk files and which modified further files. The Forensic Analysis Subsystem also utilizes a scan of the series of snapshots to identify uncorrupted versions of a corrupted file and unmodified versions of a modified file. The Forensic Analysis Subsystem may optionally utilize the Malware Scanning Subsystem to verify whether a particular version of a file is corrupted. The Data Snapshot Subsystem saves data that is necessary and sufficient to reconstruct one or more versions of a file where a file version is defined as an exact image of the file as it existed at a previous point in time. Each version of the file that can be reconstructed, is referred to as a snapshot. The File System Activity Tracking Subsystem generates data that may be used to construct a history of activity relating to a file. This history advantageously contains necessary and sufficient information to identify intervals during which the file was not at risk of being corrupted. The File Recovery Subsystem provides for reconstructing previous versions of files based on the data collected by the Data Snapshot Subsystem. The reconstructed versions of the file may be the most recent uncorrupted version of the file or another uncorrupted version of the file identified by scanning the series of snapshots.

According to one exemplary scenario, the invention provides a process and a computer program product with encoded instructions for performing the following steps to detect malware and to remedy the situation once malware has been detected.

In Step 1, the Malware Scanning Subsystem detects malware in a file.

In Step 2, the Forensic Analysis Subsystem reviews the snapshot information in the data backups made, to that point, of the file storage volumes containing the files of interest. The Forensic Analysis Subsystem scans the snapshot information starting with the most recent snapshot to determine when the file had been corrupted to the closest point in time to the present, as possible.

In Step 3, the corrupted file is replaced by the File Recovery Subsystem with a copy that resides within the snapshot data identified in Step 2, i.e., with an uncorrupted file.

In Step 4, with the Malware Recovery System having located and restored an uncorrupted version of the file, the Forensic Analysis Subsystem scans the available event log for any writes that may have occurred after the file began execution but before the application finished execution, subsequent to the point in time identified as corresponding to the most recent uncorrupted version of the file. The files that were modified by these writes are then identified as being possible candidates for malware corruption, i.e., at-risk files, and Steps 1 through 3 are then repeated on such identified files.

Continuing in the exemplary scenario, in Step 5 the Malware Scanning Subsystem scans the event log generated by the File System Activity Tracking Subsystem, for any writes that occurred to the file subsequent to the creation of the identified snapshot. The applications that were running at the time this write occurred are also identified and the malware scanning subsystem scans these for possible malware corruption. Following this scan, Steps 1 through 5 are then repeated on the identified (corrupted or at-risk) files in a recursive or iterative manner to identify additional files that were modified and which are possibly corrupted by the identified (corrupted or at-risk) files. These files which are then restored to their unmodified versions. The exemplary 5 step scenario is presented by way of example, to illustrate the capabilities of the invention, which is not limited to 5 discrete steps.

The following definitions are useful in understanding the algorithms illustrated by the flow diagrams shown in FIGS. 1-4, and which describe the invention. The Infected File List includes a list of names of files found by AV scanning and forensic analysis to be corrupted or at risk of corruption. The Series of Data Snapshots is the set of data snapshots in the data backup as previously defined. The File Activity Event Log or simply Event log, is a log of ordered events including snapshot creation events and write events. S(X) indicates snapshot number X and M(F,T) designates a process, or write, derived from file F that may have modified target file T. The following system outputs are also defined as appear in FIGS. 1-4. A Recovery List is a list of ordered pairs (F,X) in which F is a corrupted file and X is the ordinal number of the snapshot that contains the most recent uncorrupted version of the file. Restored Data is defined as restored files that were previously corrupted or modified, i.e., at risk of corruption.

FIG. 1 is a flow diagram showing how the initial Recovery List is developed. For each file F in the Infected File List, the snapshots are scanned to find the most recent snapshot, X, in which file F was not corrupted, or did not exist. FIG. 1 illustrates how the ordered pair (F,X), i.e., the file F with the snapshot of the most recent uncorrupted version of the file, is added to the Recovery List if not previously in the Recovery List. After the Recovery List is established, the process continues with the forensic scan shown in FIG. 2 or the backward forensic scan shown in FIG. 3 utilizing the Recovery List.

FIG. 1 shows the beginning of the recovery process for developing the Recovery List by determining an infected file and finding the most recent non-infected version of the infected file by scanning those files and previous snapshots. At point A (110) an Infected File List is provided. In one embodiment the next file name from the Infected File List emanates from step (134) as will be described below. A file name, or the "next file" name when the process is repeated, is obtained from the Infected File List defined above, at (112). At step (114) it is determined if this file name represents the end of the Infected File List. If yes, a forensic scan is performed (116) as previously described and the process of adding to the Recovery List is done (118).

If the file does not represent the end of the Infected File List, a previous snapshot is obtained (120). A determination is made if there are no additional snapshots (122). If there are no additional snapshots, i.e. no further snapshots of the file before it was infected, is concluded that the file was infected prior to protection (124). If it is determined that there are additional snapshots, the current file is found by scanning the set of snapshots defined above, at step (126). If the file is found (128) in the additional previous snapshot, that file version is scanned with a malware scanner. (130). It is determined at (132) if the file version is still infected. If yes, a previous snapshot is obtained (120) to see if previous versions were infected. If the file version that was obtained is not infected, this file name and the ID of the snapshot that the uncorrupted version of the file was found in are added to the Recovery List at (134), i.e., the information about the most recent non-infected version of the file is added to the Recovery List. If the file is not found at step (128) by the snapshot scan, the file name is inserted to the file recovery list at (134). After step (134), the process continues, repeating itself, at step A (110) where the next file is obtained from the Infected File List at step (112) and the previously described process continues.

Figure 2:
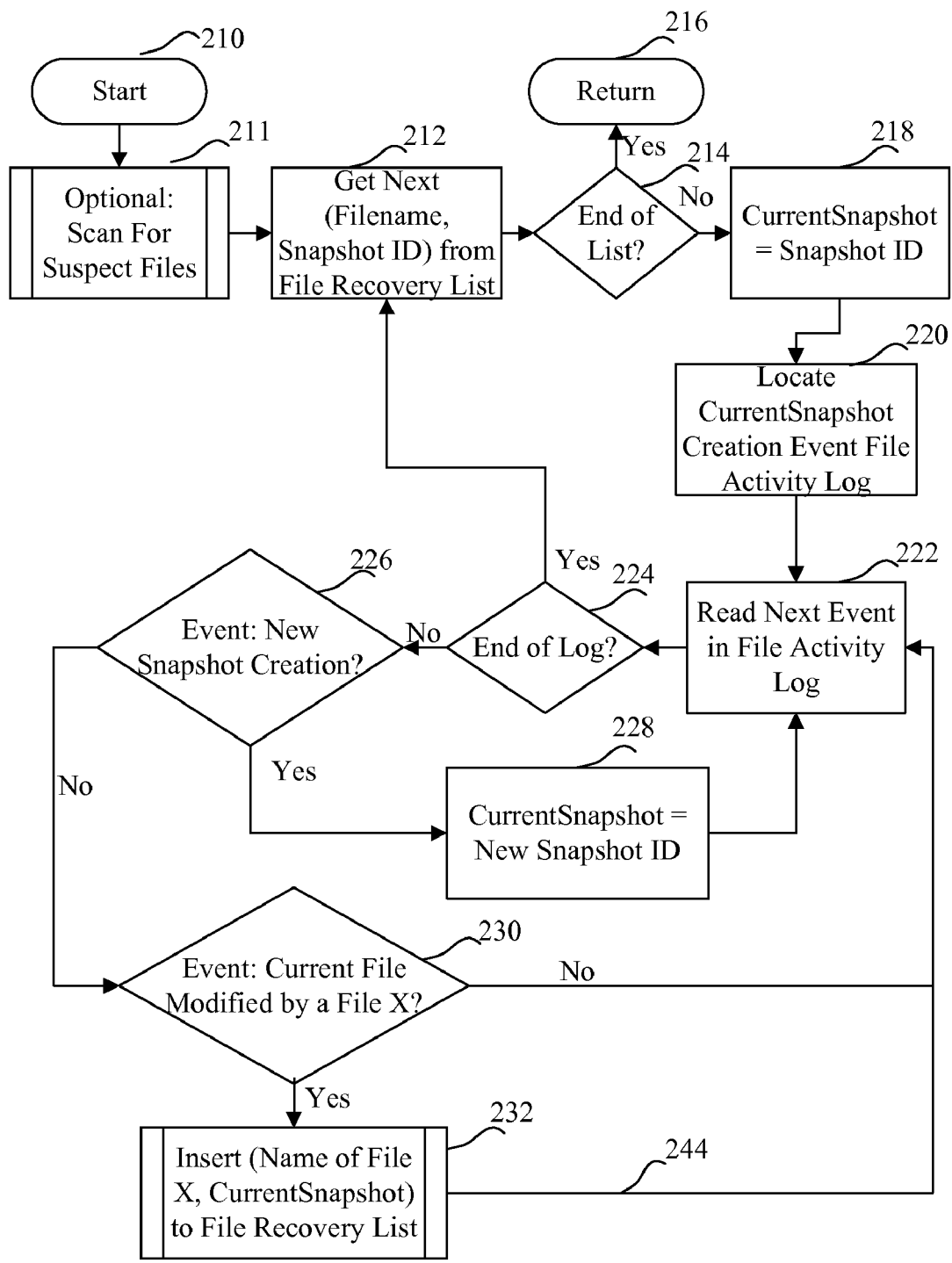
FIG. 2 is a flow chart showing a forensic scan which locates files that were modified by an infected file and which are therefore at risk.
Figure 3:
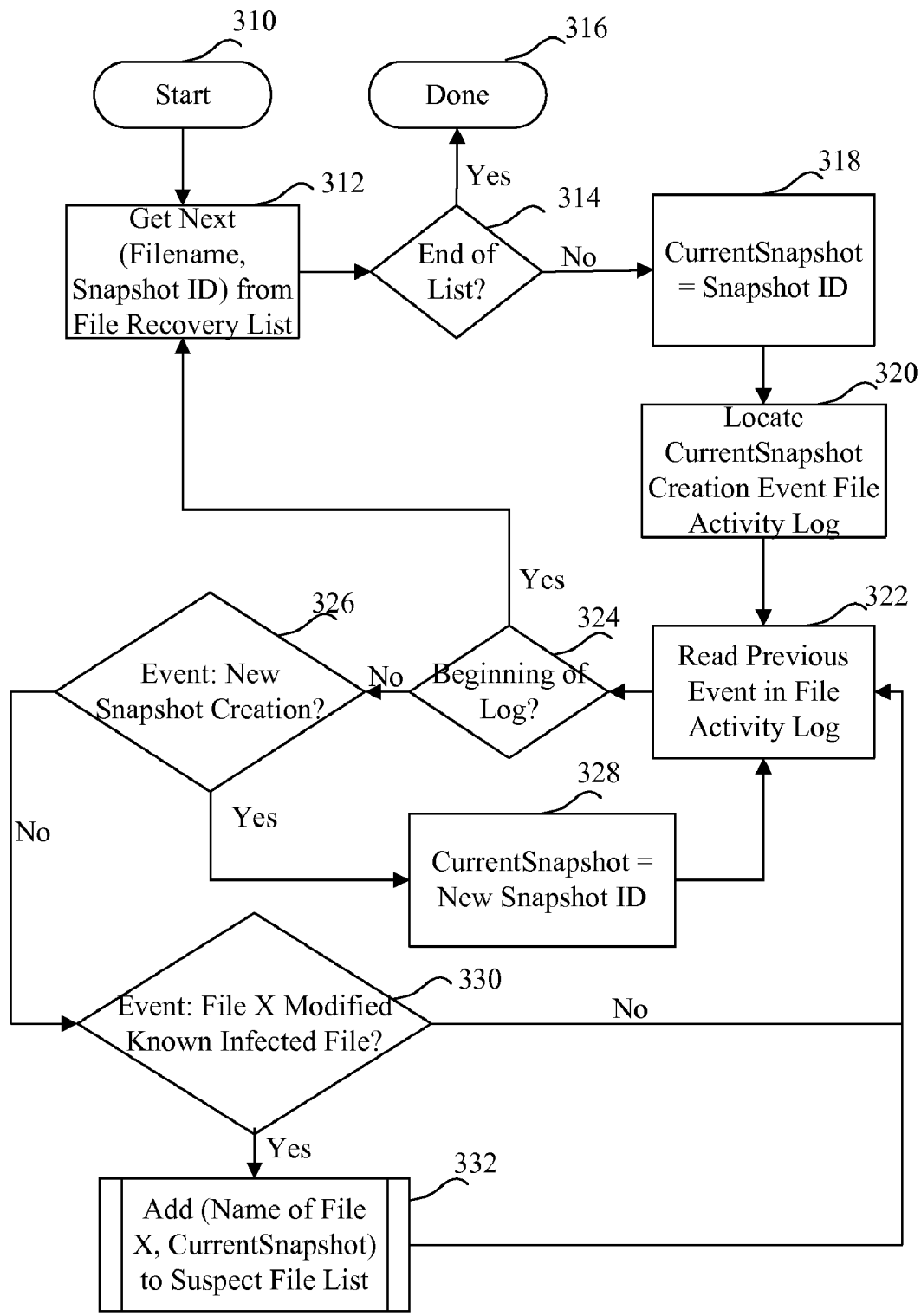
FIG. 3 is a flow chart showing how to locate files that may have infected files that were marked infected by a malware scanner.

FIG. 2 shows a further sequence in the compilation of the Recovery List. FIG. 2 shows a process flow of the forensic scan that locates files that were modified by an infected file and which are therefore at risk and added to the Recovery List. The repetitive process illustrated in FIG. 2 shows, at step (212) indexing to the next ordered pair (file name—F, snapshot ID—X) from the file Recovery List. According to one exemplary embodiment, the process may start at step (210) and include an optional step (211) to scan for suspect files. The details of the scan for suspect files is shown in FIG. 3. The forensic scan shown in the process flow of FIG. 2 shows how, for each ordered pair (F,X) in the file Recovery List, the File Activity Event Log is scanned starting at the event S(X). More particularly, for each file T in which an event M(F,T) (file T was modified by file F) is encountered in the log, the File Activity Event Log is scanned backwards to identify the most recent snapshot event S(R) of file T that was created prior to the time of potential corruption. The ordered pair (T,R) is then added to the file Recovery List, if not already in the list, at step (232) as described below.

If the file obtained from the file Recovery List represents the end of the list (214), the process is returned at step (216) to step (116) of the flow chart of FIG. 1. If the file does not represent the end of the file Recovery List, the current snapshot, i.e. snapshot X of the ordered pair (F,X) is assigned the snapshot ID at step (218), and the snapshot creation event associated with this snapshot is located in the File Activity Event Log at step (220). The next event of the File Activity Event Log is read at step (222) and if that next event represents the end of the log (224), the system returns to step (212). If the next event does not represent the end of the File Activity Event Log, the process continues at step (226) where it is determined if the event represents a new snapshot creation event. If yes, step (228), the current snapshot is reassigned as the snapshot ID and the process returns to step (222). If no, it is determined at step (230) whether the current file was modified by another file X: if no; the process returns to step (222) and if yes, the name of file X and the current snapshot is added to the file Recovery List. At step (232), the ordered pair (T,R) is added to the file Recovery List if not already in the list. If file T is already in the file Recovery List with associated snapshot Y, but not yet processed, i.e. scanned to verify that file T was not infected in snapshot Y, then Y is replaced with R if R is an older snapshot. Conversely, if file T is already in the list with associated snapshot Y which has already been processed, then the ordered pair (T,R) is added to the file recovery list only if Y is an older snapshot than R. If R is an older snapshot than Y, then the ordered pair (T, R) is added to the file recovery list. The algorithm/flow chart shown in FIG. 4 illustrates the process carried out in step (232) of FIG. 2, in more detail.

FIG. 3 is a process flow showing an optional "backward" scan of suspect files. This scan locates files that may have infected the files which were marked infected by the AV scanner. The scan includes, for each file F in the file recovery list, scanning backwards in the File Activity Event Log starting at the event S(X), i.e. the snapshot at time X. File C may be identified which corresponds to an event M(C,F) which is encountered in the File Activity Event Log. M(C,F) represents that file F was modified by file C, suggesting that file C may be infected. File C is added to the suspect file list if not already either in the suspect file list or the infected file list.

Figure 4:
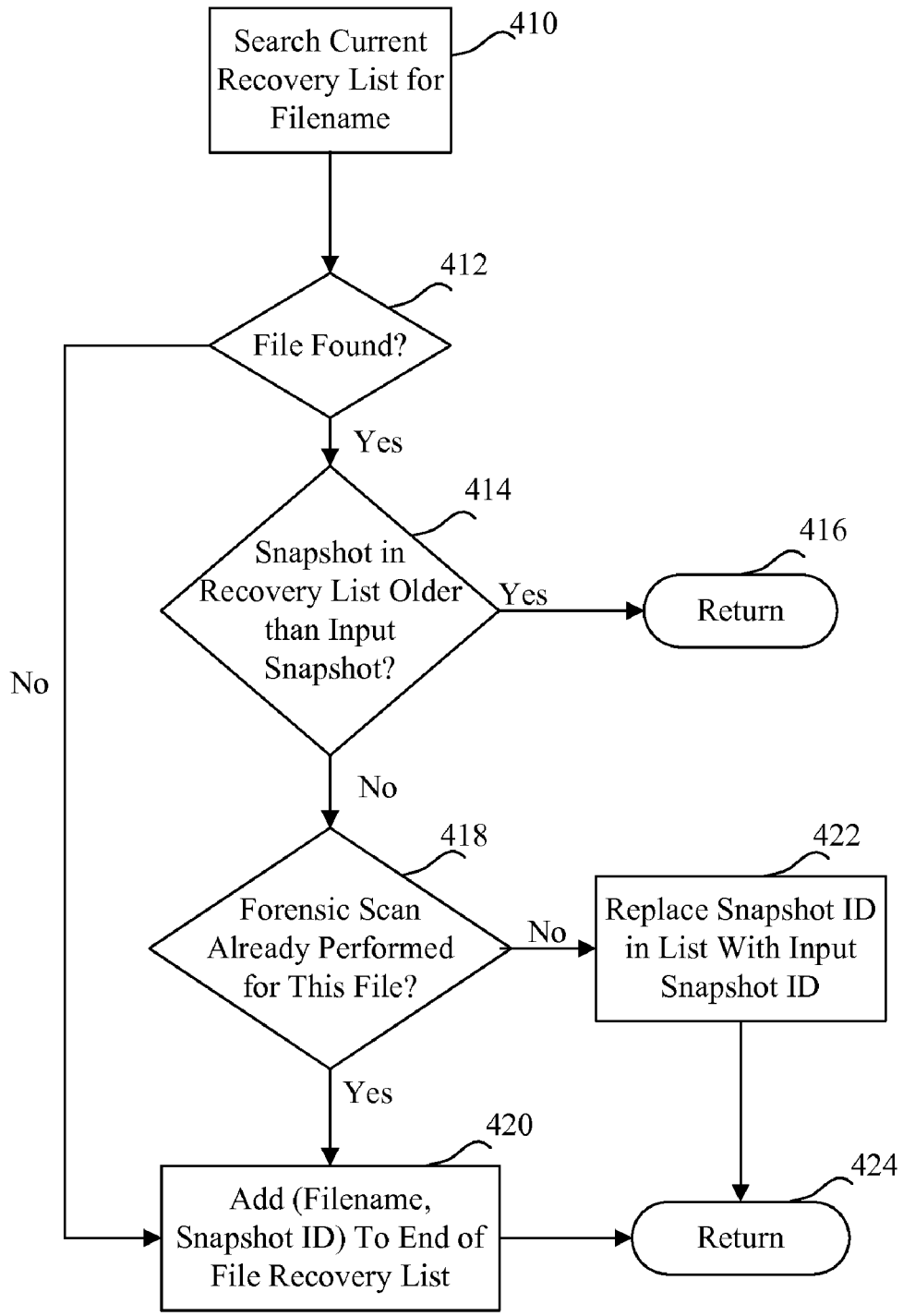
FIG. 4 is a flow chart showing the insertion of a file name and snapshot ID pair into a file recovery list.

FIG. 4 shows the insertion of an input (file name, snapshot ID) pair into the file Recovery List. A file name and snapshot ID representing a known corrupted file together with the ID of the snapshot that contains the most recent version of the file known to be uncorrupted, i.e., the snapshot immediately before corruption, are input into the system and at step (410) the system searches the current file Recovery List for the input file name. If the file is not found as already being in the Recovery List at step (412) (i.e., as a known corrupted file with a most recent uncorrupted version thereof), the input file name, snapshot ID is added to the end of the Recovery List at step (420) as the file will eventually be recovered to an uncorrupted version thereof.

If the file is found as being in the Recovery List, at step (412), it is determined at step (414) if the snapshot already in the Recovery List associated with the input file name, is older than the input snapshot. If yes, i.e., the input snapshot is more recent than the most recent uncorrupted version of the snapshot already in the Recovery List, the system returns to the flow chart shown in FIG. 2. at step (232), continuing at (244) to read the next event at (222) and continue the process. If no, i.e., the input file is older and predates the snapshot already in the Recovery List to establish that the file had been corrupted earlier than previously known, the system does not return to the flow chart shown in FIG. 2. at step (232). Rather, it is determined if a forensic scan searching for other corrupted files, has already been performed for this file at step (418). If the forensic scan has not already been performed, the snapshot ID previously in the Recovery List is replaced with the input snapshot ID at step (422) and the scan is performed on the newly identified input pair. If the forensic scan has already been performed, the input pair of the file name and snapshot ID is added to the end of the file Recovery List at step (420). I.e. the file is placed in the recovery list a second time so that the forensic scan will be repeated for the input file, starting at a point in time immediately following the snapshot that was newly discovered to be the most recent snapshot prior to a corruption of the input file. After the update that takes place at either step (420) or (422), the process continues by returning (step 424) to the flow chart shown in FIG. 2, at step (232), continuing at (244) to read the next event at (222).

With specific reference to FIG. 3, the process starts with the file Recovery List at step (310) and at step (312), the ordered pair of the file name, snapshot ID (F,X) is obtained from the file Recovery List. At step (314) it is determined if this represents the end of the list. If yes, the process is done at step (316). If no, the current snapshot is assigned as the snapshot ID at (318) and the associated snapshot creation event for this snapshot, is located in the File Activity Event Log at (320). The event that takes place immediately before the snapshot creation event located in step (320), is then read at step (322). It is then determined if this event represents the beginning of the log at step (324). If yes, the process continues at step (312). If no, it is determined if the event represents a new snapshot creation event at step (326). If this does represent a new snapshot creation event, the snapshot associated with the currently identified snapshot is reassigned the new snapshot ID (328) and the event run previous to the newly identified snapshot ID is read at step (322). If this does not represent a new snapshot creation event ("no"), it is determined at step (330) if the identified file X has modified a known infected file. If yes, the ordered pair of the name of file X and the current snapshot are added to the suspect file list at step (332) and the previous event in the file activity event log is read at step (322). When the forensic scan for suspect files as shown in FIG. 3, is completed, the system continues onto step (212) of the process flow shown in FIG. 2. The suspect file scan shown in FIG. 3 identifies and isolates files that modified one or more files in the Infected Files List before such files became infected. These isolated files are identified as being suspect even if the AV scanner does not positively detect them as being infected. These files may be quarantined and re-scanned in the future or it may be assumed that these files are infected, in which case they will be added to the infected files list to be processed by the malware recovery system.

According to other exemplary embodiments, in operating systems in which it is difficult to determine which process has written to a file, the events M(F,T) can be derived from other types of events. In one exemplary embodiment, it may be possible to recognize a point in time, R(F), when a process derived from file F may be running and a point in time N(F) when this process is not running. In this embodiment, the event M(F,T) may be derived when the first write to file T occurs during the interval [R(F)-N(F)]. M(F,T) may be added at this point to cover the possibility that the file was modified by the corrupted process.

In some exemplary embodiments, it may be difficult to detect when a process derived from a file F is running. For example, a data file may contain a macro that can infect an existing process when that process reads and processes the macro. However, it may be possible to detect when a file is read and the event R(F) would be concurrent with the first time infected file F is read, since it is possible that the data read from the file and loaded into memory will be executed. Further, the files open at a given point in time may be detected, then the event N(F) may be entered when it is determined that the process that read F is closed.

It is advantageous to maintain referential integrity when selectively restoring files. The above description does not include any requirement to maintain referential integrity across multiple files. The technology of the invention may advantageously retain integrity across multiple files by recovering each of them from the same point in time as the infected file, using conventional methods and instructions.

The technology of the invention can be used to selectively restore sections of data within a single file by replacing only those sections of data within a current file from a previous snapshot. This can be used to preserve uncontaminated data within a file even if it was added or modified after the time of an attack. This assumes that information is available that describes the data relationships and referentially integrity rules of the data within the file.

The technology of the invention also provides for advantageously maintaining transactional integrity when recovering data from previous versions of files. In the above description, it is assumed that a transaction spans the period of time in which a file is open. Whenever transactional information must be maintained beyond the boundaries of a single interval in which the file is open, it should be understood that this technology provides for retaining transactional integrity by recording M(F,T) each time a new transaction begins rather than each time a file is opened.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for malware recovery in a computer system comprising:
   a) repeatedly making associated data backups at the computer system for each of a plurality of files by making a series of snapshots of file storage volumes containing said plurality of files, each of said data backups comprising versions of said associated file, including uncorrupted versions of said associated file in an uncorrupted state;
   b) determining that an attack by a malicious program has occurred at the computer system;
   c) identifying at the computer system corrupted files of said plurality of files that were corrupted by said malicious program;
   d) for each said corrupted file, scanning by the computer system said series of snapshots to identify an uncorrupted version of said uncorrupted versions of said file;
   e) for each said corrupted file, restoring at the computer system said file to one of said uncorrupted versions thereof;
   f) creating and maintaining an event log at the computer system that contains write events corresponding to writes performed by said plurality of files;
   g) performing a forensic scan that scans said event log to determine modifying writes of said writes that were made by said corrupted files and which modified further files of said plurality of files; and
   h) for each of said further files, identifying unmodified versions thereof and restoring at the computer system said further file to one of said unmodified versions thereof.

2. The method as in claim 1, wherein said scanning identifies a most recent version of said uncorrupted versions.

3. The method as in claim 1, wherein said step e) comprises replacing at the computer system said corrupted file with said most recent uncorrupted version thereof.

4. The method as in claim 1, wherein the event log further contains snapshot creation events corresponding to creation of each of said snapshots.

5. The method as in claim 4, further comprising:
   h) defining a first list of at-risk files comprising said corrupted files and said further files;
   i) performing a forensic scan that scans said event log to determine modifying writes of said writes that were made by said at-risk files and which modified additional files of said plurality of files; and
   j) adding said additional files to said first list and repeating said step i).

6. The method as in claim 5, further comprising determining modifier files of said plurality of files that modified said corrupted files and identifying prior versions of each of said modifier files that existed prior to modifying said corrupted file, and adding said modified files to said first list and repeating said step i).

7. The method as in claim 4, further comprising scanning said event log to identify said snapshot creation event and associated snapshot of a most recent unmodified version of said unmodified versions of said further file.

8. The method as in claim 4, wherein said restoring at the computer system said further file comprises replacing said further file with said corresponding unmodified version thereof that exists in said snapshot corresponding to a most recent one of said snapshot creation events that precedes an initial write of said modifying writes by which said further file was first modified by one of said corrupted files.

9. The method as in claim 4, wherein said write events and said snapshot creation events are ordered in said event log chronologically.

10. The method as in claim 4, wherein said event log further contains a plurality of write groups, each comprising all of said write events that occur between two successive snapshot creation events of said snapshot creation events, and further comprising scanning said event log to identify first write groups of said write groups that include least recent modifying writes of said modifying writes.

11. The method as in claim 1, further comprising:
repeating a process that identifies additional modified files of said plurality of files that were modified by said modified files.

12. The method as in claim 11, wherein said repeating a process includes restoring at the computer system each said additional modified file to a respective unmodified version thereof.

13. The method as in claim 11, wherein said repeating a process comprises iteratively identifying additional modified files of said plurality of files that were modified by said modified files.

14. The method as in claim 11, wherein said repeating a process comprises recursively identifying additional modified files of said plurality of files that were modified by said modified files.

15. The method as in claim 14, wherein said recursively identifying includes scanning said event log to determine modifying writes of said writes that were made by said modified files and which modified said additional modified files.

16. A method for malware recovery in a computer system comprising:
a) repeatedly making associated data backups at the computer system for each of a plurality of files by making a series of snapshots of file storage volumes containing said plurality of files, each of said data backups comprising versions of said associated file, including uncorrupted versions of said associated file in an uncorrupted state;
b) determining that an attack by a malicious program has occurred at the computer system;
c) identifying at the computer system corrupted files of said plurality of files that were corrupted by said malicious program;
d) for each said corrupted file, scanning by the computer system said series of snapshots to identify an uncorrupted version of said uncorrupted versions of said file;
e) for each said corrupted file, restoring at the computer system said file to one of said uncorrupted versions thereof;
f) creating and maintaining an event log at the computer system that contains write events corresponding to writes performed by said plurality of files; and
g) scanning said event log to determine further files of said plurality of files that modified said corrupted files and identifying prior versions of each of said further files that existed prior to modifying said corrupted file.

17. The method as in claim 16, further comprising restoring at least one said further files to one of said prior versions thereof.

18. The method as in claim 17, wherein said event log further includes snapshot creation events corresponding to creation of each of said snapshots, the method further comprising:

g) scanning said event log to determine modifying writes of said writes that were made by said further files to affect said corrupted files of said plurality of files.

19. The method as in claim 18, wherein said restoring each said further file to one of said prior versions thereof comprises scanning said event log to identify said snapshot creation event and corresponding snapshot of said one of said prior versions thereof.

20. A method for malware recovery in a computer system comprising:
a) repeatedly making associated data backups at the computer system for each of a plurality of files by making a series of snapshots of file storage volumes containing said plurality of files, each of said data backups comprising versions of said associated file, including uncorrupted versions of said associated file in an uncorrupted state;
b) determining that an attack by a malicious program has occurred at the computer system;
c) identifying at the computer system corrupted files of said plurality of files that were corrupted by said malicious program;
d) for each said corrupted file, scanning by the computer system said series of snapshots to identify a most recent uncorrupted version of said uncorrupted versions of said file; and
e) for each said corrupted file, restoring at the computer system said file to said most recent uncorrupted version thereof;
f) creating and maintaining an event log that contains write events corresponding to writes performed by said plurality of files, and snapshot creation events corresponding to creation of each of said snapshots;
g) performing a forensic scan that scans said event log to determine modifying writes of said writes that were made by said corrupted files and which modified further files of said plurality of files;
h) restoring at the computer system each of said further files to an unmodified version thereof; i) defining a first list of at-risk files comprising said corrupted files and said further files; and
j) identifying additional files of said plurality of files that were modified by said at-risk files.

21. A computer program product storing thereon computer-readable instructions for causing a computer system to perform operations comprising:
a) repeatedly making associated data backups at the computer system for each of a plurality of files by making a series of snapshots of file storage volumes containing said plurality of files, each of said data backups comprising versions of said associated file, including uncorrupted versions of said associated file in an uncorrupted state;
b) determining that an attack by a malicious program has occurred at the computer system;
c) identifying at the computer system corrupted files of said plurality of files that were corrupted by said malicious program;
d) for each said corrupted file, scanning by the computer system said series of snapshots to identify an uncorrupted version of said uncorrupted versions of said file; and
e) for each said corrupted file, restoring at the computer system said file to one of said uncorrupted versions thereof;

f) creating and maintaining an event log at the computer system that contains write events corresponding to writes performed by said plurality of files;

g) performing a forensic scan that scans said event log to determine modifying writes of said writes that were made by said corrupted files and which modified further files of said plurality of files; and h) for each of said further files, identifying unmodified versions thereof and restoring at the computer system said further file to one of said unmodified versions thereof.

22. The computer program product as in claim 21, wherein said scanning identifies a most recent version of said uncorrupted versions.

23. The computer program product as in claim 21, wherein said step e) comprises replacing said corrupted file with said most recent uncorrupted version thereof.

24. The computer program product as in claim 21, wherein the event log further contains snapshot creation events corresponding to creation of each of said snapshots.

25. The computer program product as in claim 24, further comprising encoded instructions for:

h) defining a first list of at-risk files comprising said corrupted files and said further files;

i) performing a forensic scan that scans said event log to determine modifying writes of said writes that were made by said at-risk files and which modified additional files of said plurality of files; and j) adding said additional files to said first list and repeating said step i).

26. The computer program product as in claim 25, further comprising encoded instructions for:

determining modifier files of said plurality of files that modified said corrupted files;

identifying prior versions of each of said modifier files that existed prior to modifying said corrupted file; and adding said modified files to said first list and repeating said step i).

27. The computer program product as in claim 24 further comprising encoded instructions for scanning said event log to identify said snapshot creation event and associated snapshot of a most recent unmodified version of said unmodified versions of said further file.

28. The computer program product as in claim 24, wherein said restoring comprises replacing said further file with said unmodified version thereof that exists in said snapshot corresponding to a most recent one of said snapshot creation events that precedes an initial write of said modifying writes by which said further file was first modified by one of said corrupted files.

29. The computer program product as in claim 24, wherein said write events and said snapshot creation events are ordered in said event log chronologically.

30. The computer program product as in claim 21, further comprising encoded instructions for:

identifying additional files of said plurality of files that were modified by said further files and restoring each said additional file to an unmodified version thereof.

31. The computer program product as in claim 30, further comprising encoded instructions for restoring at the computer system at least one said further file to one of said prior versions thereof.

32. The computer program product as in claim 21, further comprising encoded instructions for determining further files of said plurality of files that modified said corrupted files and identifying prior versions of each of said further files that existed prior to modifying said corrupted file.

33. The computer program product as in claim 32, wherein the event log further includes snapshot creation events corresponding to creation of each of said snapshot, further comprising encoded instructions for:

scanning said event log to determine modifying writes of said writes that were made by said further files to affect said corrupted files of said plurality of files.

34. The computer program product as in claim 33, wherein said restoring each said further file to one of said prior versions thereof comprises scanning said event log to identify said snapshot creation event and corresponding snapshot of said one of said prior versions thereof.

35. The computer program product as in claim 21, further comprising encoded instructions for:

f) identifying modified files of said plurality of files that were modified by said corrupted files; and g) repeating a process that identifies additional modified files of said plurality of files that were modified by said modified files.

36. The computer program product as in claim 35, wherein said repeating a process includes restoring at the computer system each said modified file and each said additional modified file to a respective unmodified version thereof.

37. The computer program product as in claim 35, wherein said repeating a process comprises iteratively identifying additional modified files of said plurality of files that were modified by said modified files.

38. The computer program product as in claim 35, wherein said repeating a process comprises recursively identifying additional modified files of said plurality of files that were modified by said modified files.

39. The computer program product as in claim 38, wherein said recursively identifying includes scanning said event log to determine modifying writes of said writes that were made by said modified files and which modified said additional modified files.

40. A computer program product storing thereon computer-readable instructions for causing a computer system to perform operations comprising:

a) repeatedly making associated data backups at the computer system for each of a plurality of files by making a series of snapshots of file storage volumes containing said plurality of files, each of said data backups comprising versions of said associated file, including uncorrupted versions of said associated file in an uncorrupted state;

b) determining that an attack by a malicious program has occurred at the computer system;

c) identifying at the computer system corrupted files of said plurality of files that were corrupted by said malicious program;

d) for each said corrupted file, scanning by the computer system said series of snapshots to identify a most recent uncorrupted version of said uncorrupted versions of said file; and e) for each said corrupted file, restoring at the computer system said file to said most recent uncorrupted version thereof;

f) creating and maintaining an event log that contains write events corresponding to writes performed by said plurality of files, and snapshot creation events corresponding to creation of each of said snapshots;

g) performing a forensic scan that scans said event log to determine modifying writes of said writes that were made by said corrupted files and which modified further files of said plurality of files;

h) restoring at the computer system each of said further files to an unmodified version thereof;
i) defining a first list of at-risk files comprising said corrupted files and said further files; and
j) identifying additional files of said plurality of files that were modified by said at-risk files.

41. A method for malware recovery in a computer system comprising:
  a) repeatedly making associated data backups for each of a plurality of files by making a series of snapshots of file storage volumes containing said plurality of files, each of said data backups comprising versions of said associated file, including uncorrupted versions of said associated file in an uncorrupted state;
  b) determining that an attack by a malicious program has occurred;
  c) identifying corrupted files of said plurality of files that were corrupted by said malicious program;
  d) for each said corrupted file, scanning said series of snapshots to identify an uncorrupted version of said uncorrupted versions of said file;
  e) for each said corrupted file, restoring said file to one of said uncorrupted versions thereof;
  f) creating and maintaining an event log at the computer system that contains write events corresponding to writes performed by said plurality of files;
  g) performing a forensic scan that scans said event log to determine modifying writes of said writes that were made by said corrupted files and which modified further files of said plurality of files; and
  h) for each of said further files, identifying unmodified versions thereof and restoring at the computer system said further file to one of said unmodified versions thereof.

42. A computer program product storing thereon computer-readable instructions for causing a computer system to perform operations comprising:
  a) repeatedly making associated data backups for each of a plurality of files by making a series of snapshots of file storage volumes containing said plurality of files, each of said data backups comprising versions of said associated file, including uncorrupted versions of said associated file in an uncorrupted state;
  b) determining that an attack by a malicious program has occurred;
  c) identifying corrupted files of said plurality of files that were corrupted by said malicious program;
  d) for each said corrupted file, scanning said series of snapshots to identify an uncorrupted version of said uncorrupted versions of said file;
  e) for each said corrupted file, restoring said file to one of said uncorrupted versions thereof;
  f) creating and maintaining an event log at the computer system that contains write events corresponding to writes performed by said plurality of files;
  g) performing a forensic scan that scans said event log to determine modifying writes of said writes that were made by said corrupted files and which modified further files of said plurality of files; and
  h) for each of said further files, identifying unmodified versions thereof and restoring at the computer system said further file to one of said unmodified versions thereof.

* * * * *